United States Patent [19]
Taussig et al.

[11] Patent Number: 5,791,286
[45] Date of Patent: Aug. 11, 1998

[54] BIRD FEEDER

[75] Inventors: Anne B. Taussig; Marc W. Bush, both of St. Louis; Timothy L. Bush, St. Charles, all of Mo.

[73] Assignee: Arundale Products, Inc., St. Louis, Mo.

[21] Appl. No.: 608,668

[22] Filed: Feb. 29, 1996

[51] Int. Cl.⁶ .................................................. A01K 39/01
[52] U.S. Cl. ............................................ 119/52.3; 119/52.2
[58] Field of Search ............................. 119/52.1, 52.2, 119/52.3, 57.9

[56] References Cited

U.S. PATENT DOCUMENTS

| | | | |
|---|---|---|---|
| D. 245,349 | 8/1977 | Fisher | D30/128 |
| 2,216,511 | 10/1940 | Copeman | 119/52.3 |
| 2,891,508 | 6/1959 | Bower | 119/52.3 |
| 2,941,506 | 6/1960 | Fulton | 119/52.1 X |
| 3,145,690 | 8/1964 | Bachman | 119/52.3 |
| 3,977,363 | 8/1976 | Fisher | 119/52.3 |
| 4,840,143 | 6/1989 | Simon | 119/52.1 |
| 5,086,730 | 2/1992 | Figley | 119/52.3 |
| 5,289,796 | 3/1994 | Armstrong | 119/52.3 |
| 5,394,641 | 3/1995 | Danca | 119/52.3 X |

*Primary Examiner*—Robert P. Swiatek
*Assistant Examiner*—Elizabeth Shaw
*Attorney, Agent, or Firm*—Polster, Lieder, Woodruff & Lucchesi, L.C.

[57] ABSTRACT

A bird feeder having separately manufactured components having a configuration which allows the components to fit together when in use, but can be disassembled for packaging, cleaning and replacement of damaged components. The components are formed from weather resistant materials, which can be transparent so that the supply of seeds can be observed for replenishment when needed, and the supply of seeds can be protected against exposure to weather conditions, while the components may have a physical size and shape to prevent access to the seeds by squirrels and climbing animals.

11 Claims, 4 Drawing Sheets

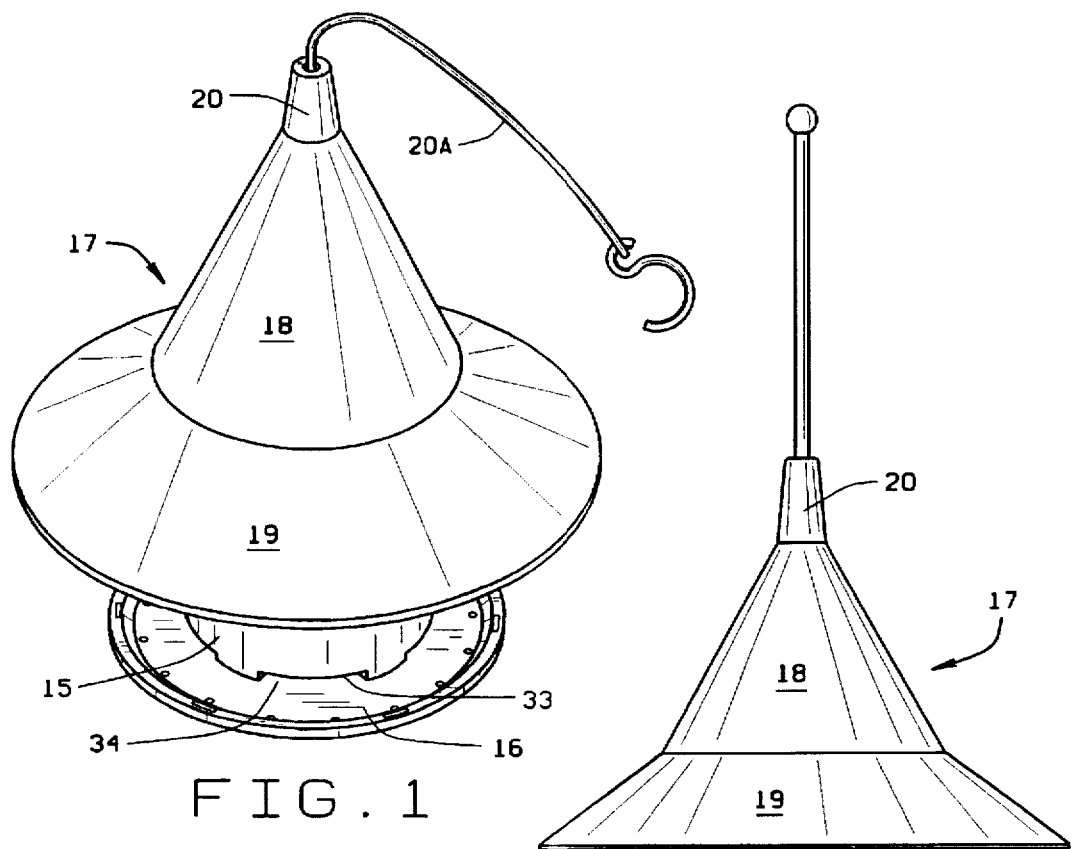
FIG.1
FIG.2
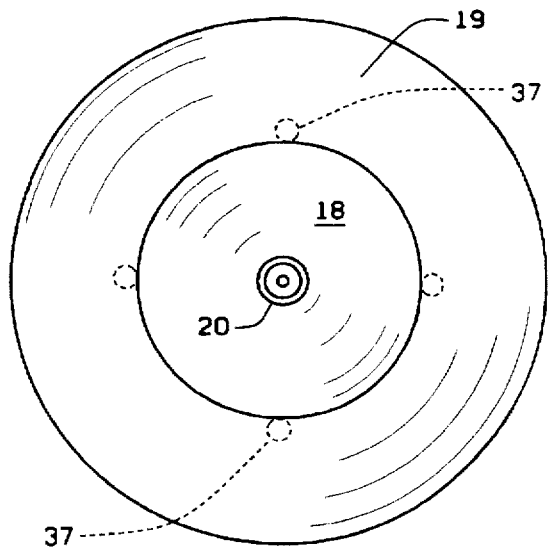
FIG.3
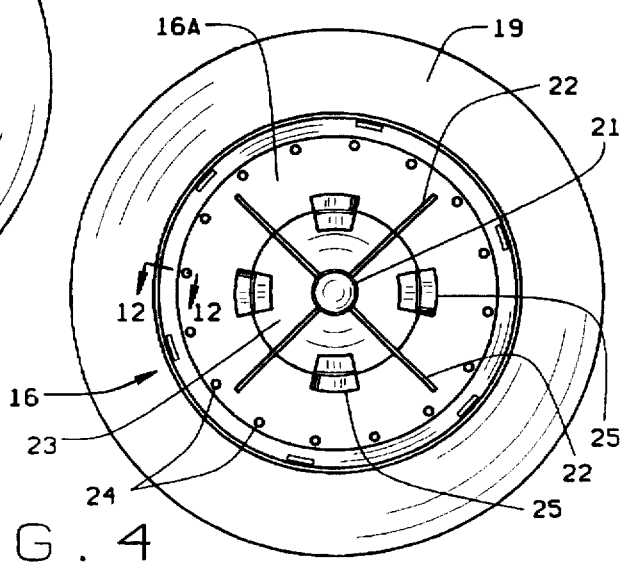
FIG.4

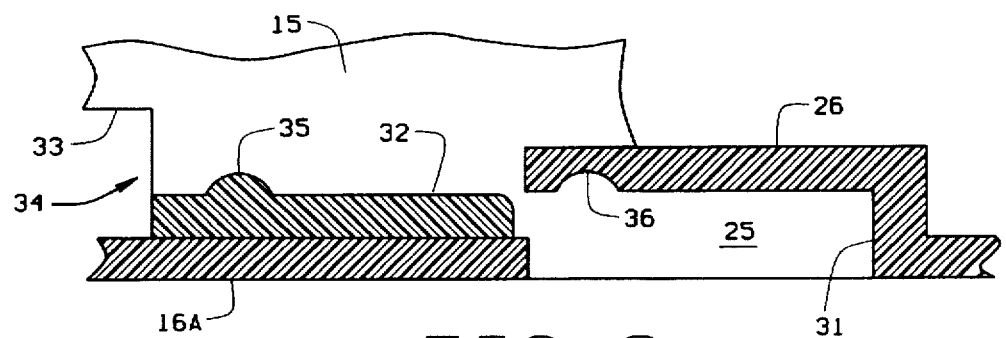
FIG. 9
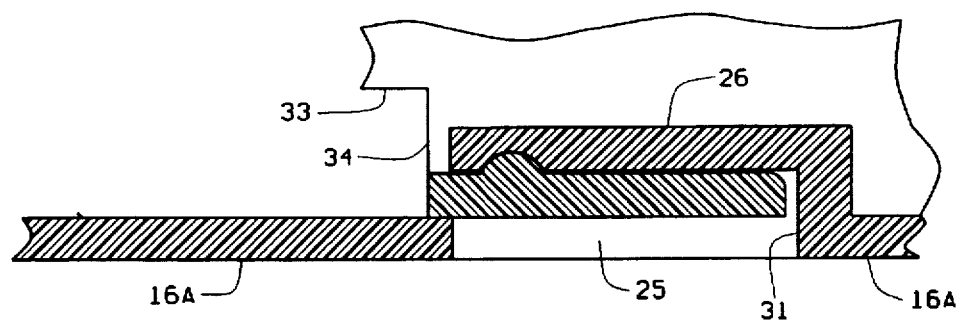
FIG. 10
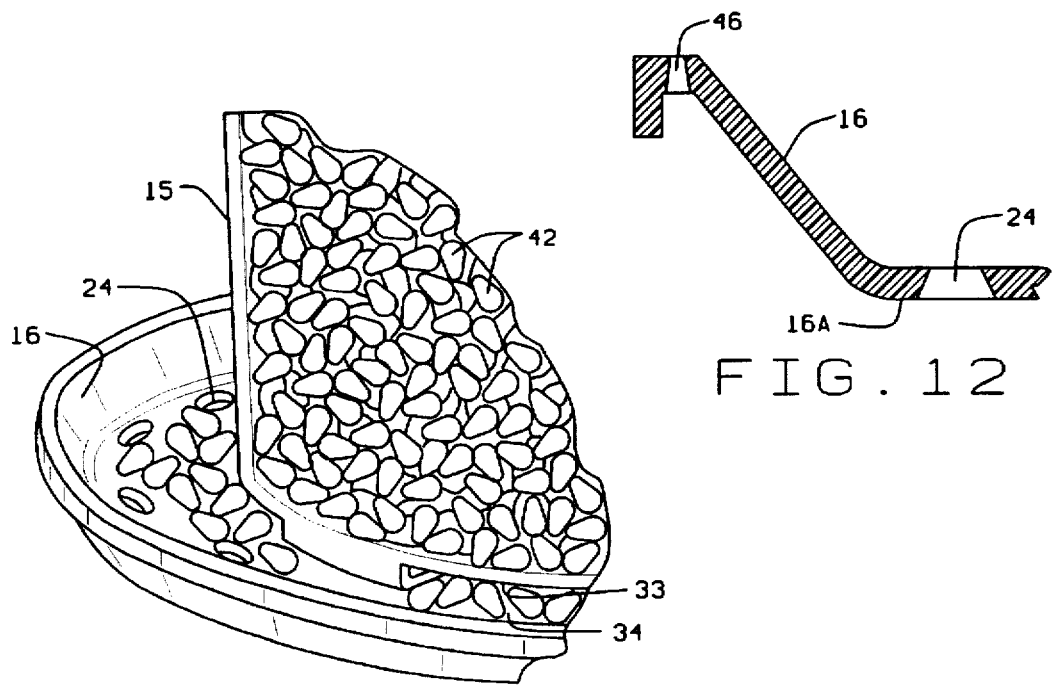
FIG. 11
FIG. 12

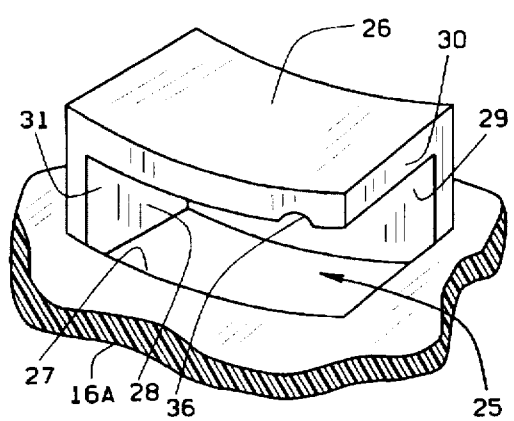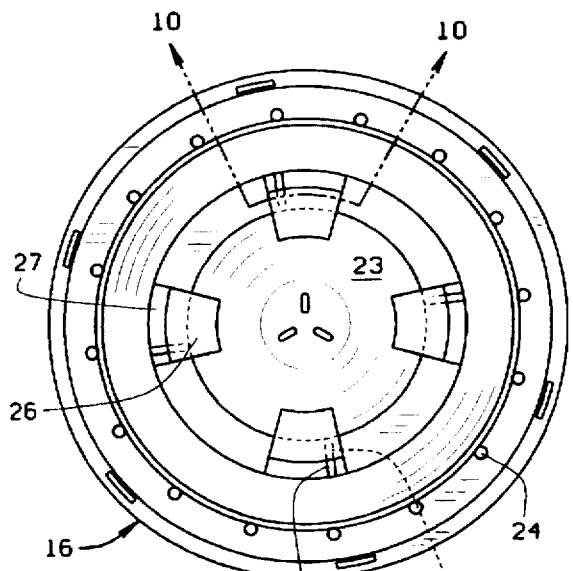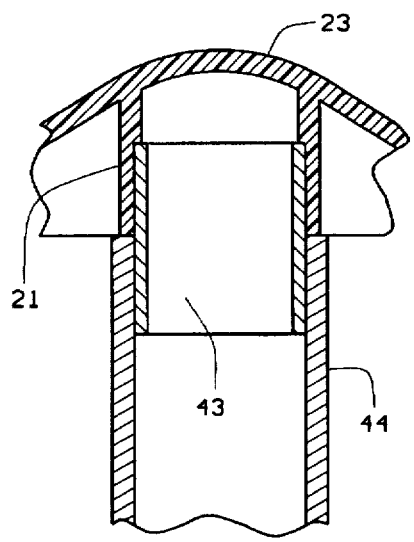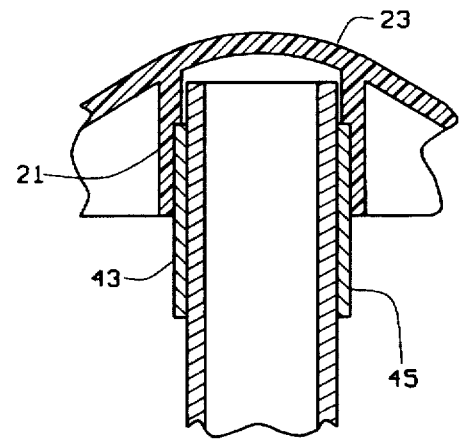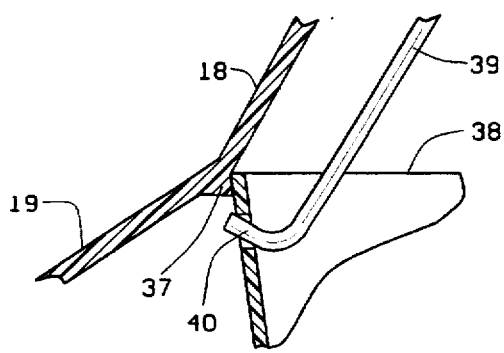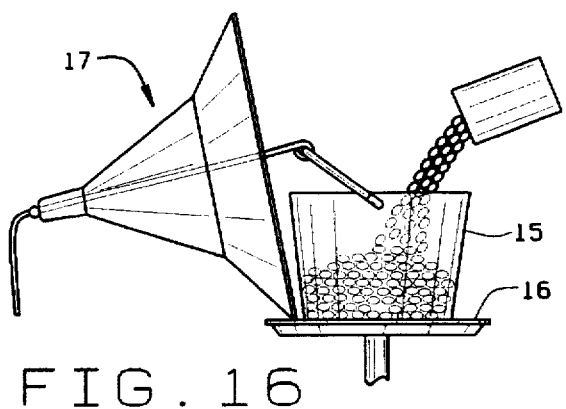

BIRD FEEDER

BACKGROUND OF THE INVENTION

1. Field of the Invention

The invention is concerned with a bird feeder having detachable components which lock together when assembled.

2. Description of the Prior Art

In order to effectively present bird seed to birds, many different constructions have been devised which contain a suitably accessible supply of bird seed for birds, and protection of the bird seed. The more common types of feeders have tubular, hopper, bowl or platform seed containers. These may employ feeding ports, or trays to facilitate controlled dispensing of seed. Feeding ports are often accompanied by perches to facilitate access to the ports by birds. These seed containers usually incorporate a cover. They are also capable of being suspended or pole mounted. Said bird feeders are usually permanently assembled in a way which does not permit easy disassembly.

Additional problems have been recognized. Squirrels are attracted to the feeders by the bird seed. The squirrels then dominate the feeder driving off birds, defeating the purpose of the feeder. Also feeders are frequently constructed of materials which are known to harbor disease. A bird feeder of this composition may spread such a disease widely. Furthermore, most bird feeders do not provide for accessory, amendment or augmentation attachment.

BRIEF DESCRIPTION OF THE INVENTION

A primary object of the invention is to create a bird feeder which combines a detachably connected hopper and platform or tray allowing easy cleaning, maintenance and/or replacement should any component be damaged or be rendered unusable. Another object is to provide a bird feeder having a minimum of parts which are easily manufactured, easily packaged, and that facilitate dispensing the bird seed.

Still another object of the invention is to provide a weather resistant feeder using materials that do not readily harbor bird disease.

A further object of the invention is to provide a bird feeder capable of being either suspended from an overhead support or mounted on a pole support.

A further object is to provide for attachment of accessories to the bird feeder by means of slotted openings.

Further objects and attendant advantages will be set forth in detail in connection with the description of the construction of the bird feeder seen in the following drawings.

BRIEF DESCRIPTION OF THE DRAWINGS

FIG. 1 is a perspective view of the bird feeder assembly showing the relative arrangements of components;

FIG. 2 is a side elevation view of the assembly seen in FIG. 1;

FIG. 3 is a top view of the squirrel guard for the feeder;

FIG. 4 is a view from underneath the feeder which is a detachably connected seed hopper and tray;

FIG. 8 is a view similar to FIG. 7 but with the tray and hopper relatively rotated to become interconnected;

FIG. 8A is a fragmentary perspective view of a typical retainer for engagement with a finger on the bottom edge of the hopper;

FIG. 9 is a fragmentary view of a typical mechanism to interconnect the tray and seed hopper, the view being taken at line 9—9 in FIG. 7;

FIG. 10 is a view with the tray and seed hopper interlocked, the view being taken at line 10—10 in FIG. 8;

FIG. 11 is a fragmentary view of the way the seed is dispensed from the hopper onto the tray for the birds;

FIG. 12 is a detail view taken at the line 12—12 in the view of FIG. 4;

FIG. 13 is a fragmentary sectional view of an adapter for pole mounting the bird feeder seen in FIG. 6;

FIG. 14 is a fragmentary sectional view of a modified adapter for pole mounting the bird feeder seen in FIG. 6;

FIG. 15 is a fragmentary sectional view of means to locate the cover over the birdseed hopper; and FIG. 16 is a pole supported view of the bird feeder to illustrate parking of the cover during replenishment with bird seed.

DETAIL DESCRIPTION OF THE INVENTION

The invention is illustrated as a squirrel proof bird feeder having a hopper and tray style either for hanging or pole mounting. The feeder has a hopper for the seeds which can be substantially fully presented to the birds. The hopper is open at the top and bottom. In addition, the feeder is constructed of components which can be separated for easy cleaning, for stacking to facilitate packaging, and to replace components that may sustain damage.

Figure 5:
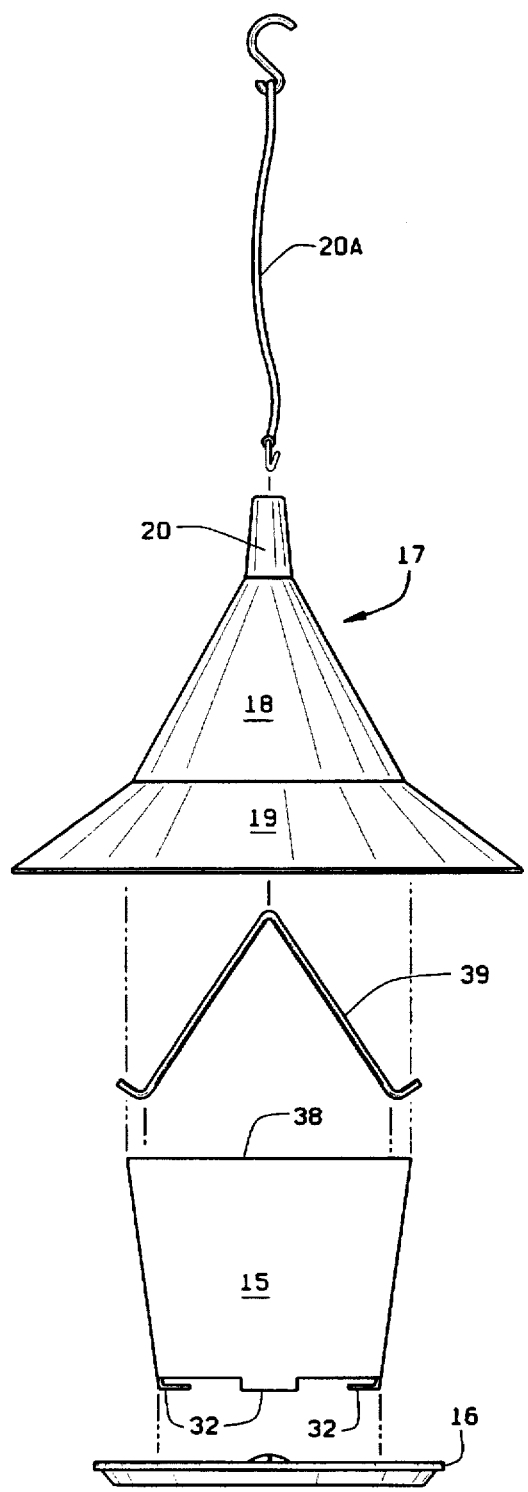
FIG. 5 is an exploded view of the feeder to illustrate the several components.

The bird feeder, as seen in FIGS. 1, 2 and 3 comprises a feed hopper or tapered cylindrical holder 15 seated on a tray configuration 16, and a squirrel proof conic cover 17 having a sharply angled central cone 18 which flares outwardly to a broad and less angled conic skirt 19 that covers the tray 16 on which the birds may perch when feeding. The central cone 18 is formed with a closing conic section defining an apex 20 which has an aperture through which a hanger member 20A may be inserted when the feeder is to be suspended or suitable retainer 41 when pole mounted. See FIGS. 1, 5 and 6.

FIG. 4 illustrates the view of the bottom surface 16A of the tray 16 when looking upward to the under surface of the conic skirt 19. The tray is formed with a downwardly open central socket 21 having circumferentially spaced gusset ribs 22 radially directed to afford a rigid support for the bottom surface 16A having a central shallow conic surface 23 FIG. 6, in the tray 16 which will be further explained in other views. A series of moisture drain holes or apertures 24 open through the tray. See FIGS. 11 and 12. The tray has a series of similar open sockets 25, each one as seen in FIG. 8A assuming a cast formation. They are spaced around the central socket 21 so as to align between the gussets 22. Each individual socket 25 has a circumferentially displaced wall 26. The outwardly displaced walls 26 have circumferentially parallel edges 27 which permit the raised surfaces 28 and 29 between the wall 26 and the edge 27 to define the limits of the socket in the top surface of the tray 16, whereby the socket 25 opens at the free end 30 of the wall 26. Each socket 25 has another slotted opening 31 above the edge 27. The slotted openings 25 and 31 are provided to receive a suitably shaped finger 32 (see FIG. 9) depending from the bottom edge 33 of the seed hopper 15. The fingers 32 are turned radially inwardly and extend below the bottom edge 33 so gaps 34 (see FIG. 10) appear between the fingers 32.

In FIGS. 7–10, it can be seen that the circular bottom edge 33 (see FIG. 9) of the hopper 15 places the radially inwardly directed fingers 32 (see FIG. 5) in alignment with the radially slotted openings 25 under the wall 26. Then by relatively rotating the hopper 15 and the tray 16, those fingers 32 can be slid under the wall 26 (FIG. 9) to seat in the socket 25. That rotation will be completed when a locking ridge 35 on each finger 32 snaps into a receiving depression 36 under the wall 26 so the tray 16 and hopper 15 are releasably interconnected. Reverse relative rotation of the tray 16 and hopper 15 will cause the fingers 32 to flex downwardly and the wall 26 to flex upwardly so the locking ridges 35 will be withdrawn from the depressions 36 to unlock the tray. Radially located on tray 16 are six accessory mounting slots 46 (see FIG. 12).

Figure 6:
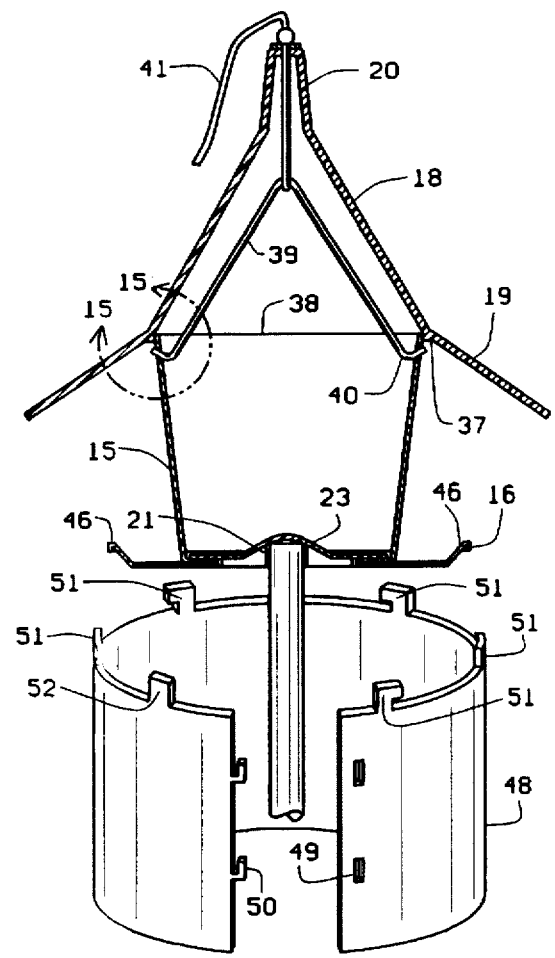
FIG. 6 is a pole supported view in section of the bird feeder to illustrate an important feature.
Figure 7:
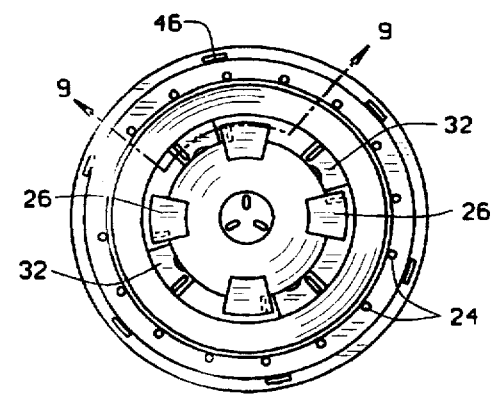
FIG. 7 is a view of the disconnection between the tray and hopper as seen looking into the seed hopper from the top, and illustrating an important feature.

In the views of FIGS. 3, 6, and 15, it can be seen that the under surface of the flared skirt 19 at the junction with the sharply conic surface 18 is formed with small projections 37 which are spaced around the skirt 19 at about 90 degrees. These projections 37 are intended to properly locate the position of the skirt 19 in abutment with the open top edge 38 of the seed hopper 15, whereby these components will tend to remain in centered positions. Also, the projections retain the skirt 19 evenly surrounding the seed hopper during windy conditions.

The view of FIG. 6 illustrates the dual feature of placing the bird feeder in service. The joining of the cover 17 to the hopper 15 is by installing a bail 39 so its hooked ends 40 engaged in diametrically opposite apertures spaced from the upper end 38 of the hopper 15. The bail 39 is held upwardly under the cover 17 by a suitable retainer 41 which emerges at the conic closure apex 20 of the cover 17. When the bird feeder is to be suspended, a flexible cord, chain or other hanging member 20A can be run up under the cover 17 and attached to the bail 39 so it extends through the conic closure 20. Thus, the several components of the bird feeder can be retained in assembly.

The drawing of FIG. 11 illustrates the gravity feed of the seeds 42 through the bottom edge gaps 33 of the hopper into the exposed surface of the tray 16. The conic surface 23 of the tray 16 functions to direct the mass of the seeds 42 outwardly on to the tray 16 by the effect of gravity, and also with the assistance of the birds landing on and leaving the tray which creates a useful agitation of the hopper 15.

A further feature of the bird feeder is seen in a fragmentary view of FIG. 12. The tray 16 as seen from line 12—12 in FIG. 4 is provided with outwardly and upwardly tapering drain holes 24. Thus, if a seed is entrapped in any of the holes 24, moisture can cause the seed to swell and that reaction is sufficient to cause expulsion of the seed so the holes 24 are relatively self cleaning.

When the bird feeder of FIG. 6 is to be pole mounted, the socket 21 seen in FIGS. 13 or 14 can be provided with a tubular extension or sleeve 43 in FIG. 13 sized to receive the pole 44. Thus, the feeder socket 21 can seat on the top of pole 44. If the pole 45 has a smaller diameter, the sleeve 43 can have an internal diameter sized to receive the pole 45 in the sleeve as in FIG. 14.

The tray 16 is formed with slots 46 for supporting accessories such as a squirrel baffle 48. The baffle is a flat sheet which circles the lip of the tray 16 and hangs from elements 51 inserted in the slots 46. More specifically seen in FIG. 6 view of the original drawing the baffle 48 is a flat sheet having slots 49 on one vertical end and mating hook projection 50 on the opposite vertical end. When the projections 50 and slots 49 are mated the skirt 48 will form a tube having 5 hook shaped projections 51 spaced around its upper margin, and one straight projection 52. The 5 projections are adapted to hook into tray slots 46 seen in FIG. 7 while the straight projection 52 cannot enter a tray slot until the skirt is rotated to engage the hook projection in the respective tray slots at which time the straight projection can enter a slot to secure the skirt to the tray and prevent unhooking of projection 51.

Having set forth the several features of the bird feeder, it is to be recognized that the component parts of the bird feeder assembly can be manufactured or molded from suitable material, whether opaque or transparent, and whether plastic or metals are used. Weather resistant material is to be preferred, and it is an important feature that the overhang of the outer edge of the flared skirt 19 relative to the rim of the tray 16 must be sufficient to prevent squirrels from reaching the tray 16. Providing a surface on the skirt that a squirrel cannot grip appears to yield the best results.

What is claimed is:

1. In a bird feeder assembly comprising a tray presenting a surface on which birds may perch for feeding, and an open top hopper located on top of the tray to hold bird seed, the improvement consisting of cooperatively formed meshing elements distributed in circularly spaced relation on said tray and said hopper in position to interengage which permit said tray and said hopper to attach and detach upon relative rotation, the interengagement of the meshing elements forming a series of spaced openings around said tray and hopper for the distribution of bird seed onto said tray.

2. The bird feeder assembly set forth in claim 1 wherein said cooperatively formed meshing elements for retaining said tray and hopper are sockets arranged in a circular spacing on said tray with openings presented to said tray and fingers on the hopper arranged to project below said hopper in position for being slidably received in said openings in said sockets upon relative rotation of said tray and hopper.

3. The bird feeder assembly set forth in claim 2 wherein said sockets and fingers have locking engagement with each other upon relative rotation of said sockets and fingers.

4. The bird feeder assembly set forth in claim 2 wherein said tray incorporates a support-pole receiving socket projecting from said tray.

5. The bird feeder assembly set forth in claim 4 wherein said tray incorporates a squirrel-proof element in the form of a socket projecting from said tray with an open bottom end directed to surround said support-pole receiving socket.

6. A bird feeder comprising:
   a) an open top hopper for bird seed;
   b) a bail element connected to said open top hopper;
   c) a cover over said open top of said hopper which receives said bail element;
   d) an open bottom of said hopper having a series of finger elements with locking element, distributed around the hopper in spaced relation;
   e) a bird seed tray; and
   f) socket means in said bird seed tray in positions to engage and lock said finger elements for retaining said tray on said hopper, said spaces between said fingers forming openings into said tray for allowing bird seed to exit from said hopper onto said tray.

7. The bird feeder set forth in claim 6 wherein said bird seed tray is formed with a raised conic surface to project into said open bottom of said hopper in position to direct bird seed through said openings onto said tray.

8. The bird feeder set forth in claim 6 wherein said bird seed tray is formed with a series of water draining apertures surrounding said open bottom hopper, said apertures being conically shaped to expel bird seed lodged in said apertures.

9. The bird feeder set forth in claim 6 wherein said cover is secured to said bail element by adjustable means permitting raising and lowering of said cover to gain access to said hopper without detachment of said cover.

10. The bird feeder set forth in claim 6 wherein said tray includes accessory slots providing means for attachment of a baffle.

11. The bird feeder set forth in claim 6 wherein said cover is movable relative to said hopper for exposing the hopper for placement of a supply of birdseed.

* * * * *